US007616655B2

(12) United States Patent
Benveniste (10) Patent No.: US 7,616,655 B2
(45) Date of Patent: Nov. 10, 2009

(54) AVOIDING EXPOSED NODE PROBLEMS IN WIRELESS LOCAL AREA NETWORKS

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 546 days.

(21) Appl. No.: 11/449,921

(22) Filed: Jun. 8, 2006

(65) Prior Publication Data
US 2007/0002887 A1    Jan. 4, 2007

Related U.S. Application Data

(60) Provisional application No. 60/688,335, filed on Jun. 8, 2005, provisional application No. 60/690,522, filed on Jun. 15, 2005.

(51) Int. Cl.
*H04L 12/413* (2006.01)
(52) U.S. Cl. .................. 370/447; 370/322; 370/348; 370/443; 370/445
(58) Field of Classification Search ................ 370/445, 370/462, 322, 348, 443, 447
See application file for complete search history.

(56) References Cited

U.S. PATENT DOCUMENTS

| | | | |
|---|---|---|---|
| 6,693,888 B2 | 2/2004 | Cararelli et al. | |
| 7,046,690 B2 * | 5/2006 | Sherman | 370/445 |
| 7,054,329 B2 * | 5/2006 | Cervello et al. | 370/447 |
| 7,161,951 B1 * | 1/2007 | Sherman | 370/447 |
| 7,164,671 B2 * | 1/2007 | del Prado et al. | 370/338 |
| 7,305,004 B2 * | 12/2007 | Sherman | 370/462 |
| 2002/0172186 A1 * | 11/2002 | Larsson | 370/349 |
| 2003/0174664 A1 * | 9/2003 | Benveniste | 370/317 |
| 2004/0037258 A1 | 2/2004 | Scherzer et al. | |
| 2005/0002355 A1 * | 1/2005 | Takano | 370/329 |
| 2005/0036448 A1 | 2/2005 | Leeuwen | |
| 2005/0089005 A1 * | 4/2005 | Sakoda et al. | 370/348 |
| 2006/0274680 A1 * | 12/2006 | Zhu et al. | 370/278 |

OTHER PUBLICATIONS

International Search Report, pp. 1-8.

* cited by examiner

*Primary Examiner*—Ricky Ngo
*Assistant Examiner*—Dewanda Samuel
(74) *Attorney, Agent, or Firm*—Chapin IP Law, LLC; David W. Rouille, Esq.

(57) ABSTRACT

A method, apparatus and computer program product for avoiding exposed nodes in Wireless local Area Networks is presented. The method includes maintaining at a node a first timer (NAV_RTS) for a channel which, if set, prevents the node from authorizing a transmission on the channel to itself and maintaining at the node a second timer (NAV_CTS) for the channel which, if set, prevents the node from transmitting on the channel. The method further includes updating the NAV_RTS when a transmission request (CC-RTS) frame is received having a reservation duration value greater than zero and greater than a current value of the NAV_RTS, and updating the NAV_CTS when a transmission response (CC-CTS) frame is received having a reservation duration value greater than zero and greater than a current value of the NAV_CTS.

22 Claims, 5 Drawing Sheets

AVOIDING EXPOSED NODE PROBLEMS IN WIRELESS LOCAL AREA NETWORKS

CROSS REFERENCE TO RELATED APPLICATIONS

The present application claims the benefit of U.S. Provisional Patent Application No. 60/688,335, filed on Jun. 8, 2005, and to U.S. Provisional Patent Application No. 60/690, 522, filed on Jun. 15, 2005, both of which are incorporated herein by reference.

BACKGROUND

Wireless Local Area Networks (WLANS) have become ubiquitous. Typically, a single channel is used for wireless communication in WLANs, which is accessed through, among others, a distributed MAC protocol. [IEEE 802.11 standard] WLANS can include multiple channels and multiple radios. An approach that offers both multi-channel and multi-radio capabilities appears in the co-pending patent application titled "A Protocol For Wireless Multi-Channel Access Control", Attorney docket number AVA06-01, filed Mar. 29, 2006, the disclosure of which is incorporated by reference herein, which describes the CCC (Common Control Channel) MAC protocol. CCC utilizes two types of logical channels, the control channel and the data channels.

In wireless Local Area Networks (LANS), a wireless channel can be reserved for the transmission of a sequence of frames while employing asynchronous distributed random channel access methods. In such an environment, both the source and destination of the transmission broadcast the reservation duration in order to establish the interference neighborhood.

According to the 802.11 distributed channel access MAC protocol, RTS/CTS frames are used to notify neighbors of a transmission. The source and destination of the transmission send the RTS and CTS control frames, respectively, which contain the reservation duration in order to establish the interference neighborhood. Nodes receiving either control frame refrain from transmitting or agreeing to receive a transmission for the specified duration.

One method of reserving the channel and preventing collisions with hidden terminals in wireless LANS is by utilizing frame-by-frame reservation. RTS/CTS frames are sent at the start of the reservation. The reservation time is extended on a frame-by-frame basis, by updating the duration of the reservation with each data frame and the acknowledgement that follows. A consequence of frame-by-frame reservation if that, if the reservation is not accepted—that is, a CTS frame is not returned in tine—there is no reserved time left unused and, hence, the reservation does not require cancellation.

SUMMARY

Conventional mechanisms such as those explained above suffer from a variety of deficiencies. One such deficiency is referred to as the 'exposed node' problem, which is exacerbated in wireless mesh networks. The exposed node problem arises when the NAV is set upon receipt of a frame from either the source (e.g. RTS/CTS) or the destination of a transmission. This NAV setting convention leads to overly conservative measures for the avoidance of collisions. A station near the source of an RTS should be prevented from transmitting if it cannot hear the CTS response. Similarly, a station that hears the CTS, but not the RTS prompting the former, should not be prevented from receiving a different transmission. This invention describes how exposed nodes can be avoided when using a multi-channel protocol like CCC.

Embodiments of the invention provide mechanisms and techniques that prevent the exposed node problem. The exposed node problem is addressed by maintaining separate NAVs for NAV-setting frames sent by the source and the destination of a transmission or a TXOP. All frames in a TXOP must be in one direction. This requirement is met by sending acknowledgements for the received frames in a group acknowledgement on the control channel.

In a particular embodiment of a method for avoiding exposed terminals, the method includes maintaining at a node a first timer (NAV_RTS) for a channel which, if set, prevents the node from authoring a transmission on the channel to itself and maintaining at the node a second timer (NAV_CTS) for the channel which, if set, prevents the node from transmitting on the channel. The method further includes updating the NAV_RTS when a transmission request (CC-RTS frame) is received having a reservation duration value greater than zero and greater than a current value of the NAV_RTS, and updating the NAV_CTS when a transmission response (CC-CTS frame) is received having a reservation duration value greater than zero and greater than a current value of the NAV_CTS.

Other embodiments include a computer readable medium having computer readable code thereon for avoiding exposed terminals, the medium including instructions for maintaining at a node a first timer (NAV_RTS) for a channel which, if set, prevents the node from authoring a transmission on the channel to itself and maintaining at the node a second timer (NAV_CTS) for the channel which, if set, prevents the node from transmitting on the channel. The medium further includes instructions for updating the NAV_RTS when a transmission request (CC-RTS) frame is received having a reservation duration value greater than zero and greater than a current value of the NAV_RTS, and instructions for updating the NAV_CTS when a transmission response (CC-CTS) frame is received having a reservation duration value greater than zero and greater than a current value of the NAV_CTS.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that avoids exposed nodes as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations avoiding exposed nodes explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Conventional wireless networks may utilize a Common Control (CCC) Protocol for medium access control. The CCC protocol is a MAC protocol that extends the IEEE 802.11 distributed MAC protocol to enable use of multiple channels within a BSS or mesh network. The CCC protocol defines a flexible channel access architecture based on distributed prioritized contention-based medium access. The CCC protocol distinguishes between two logical channel functions, the Control Channel (CC) and the Data Channel (DC). In the description that follows, stations or mesh points observing the CCC MAC protocol are referred to as 'nodes'. Nodes exchange control and management frames on the control channel. The data channels carry data traffic.

Reservations for transmission on the various data channels are made by exchanging control frames on the control channel. As extensions of the legacy RTS and CTS messages, the CC-RTS and CC-CTS are used to reserve a data channel for the time it takes to transmit a Transmission Opportunity (TXOP). A TXOP is a sequence of frames (and their respective acknowledgements) transmitted serially, immediately following a single successful contention-based channel access attempt, as for instance that prescribed by the IEEE 802.11e standard. The particular data channel selected for transmission of the TXOP is indicated in a special field on the CC-RTS/CC-CTS. The CC-RTS/CC-CTS exchange could be defined so that it can reserve multiple data channels, or a data channel and the control channel, for the same time interval. A node keeps track of the length of time for which a channel(s) is reserved in a channel-specific NAV, based on the value of the Reservation Duration field of the CC-RTS/CC-CTS.

Both the forwarding and receiving node maintain a NAV for each usable channel. A node monitors the control channel and keeps track of all reservations made by other nodes to determine the busy/idle status of data channels, and when they will become available. The Reservation Duration field on the CC-RTS/CC-CTS is used to update the NAV for the channel reserved. The CC-RTS/CC-CTS Reservation Duration field is different from the Duration/ID field in the MAC header of the CC-RTS/CC-CTS frames. The latter indicates the length of the CC-RTS/CC-CTS transmission on the control channel. A reservation request is declined if the receiving node deems the requested channel busy, or if all its radios are busy.

The receiving node responds with a CC-CTS within a time interval of length Short InterFrame Space (SIFS). A CC-CTS is sent to indicate acceptance of a channel reservation request. The Reservation Duration field is copied in the CC-CTS sent by the receiving node. If a CC-CTS is not received, the forwarding node assumes that the reservation request is declined. A reservation is accepted if the data channel indicated in the CC-RTS will become idle within a pre-specified time interval, according to the NAV maintained by the receiving node and if the receiving node has available radios to receive the transmission. Successful receipt of a data traffic transmission is followed by an acknowledgement sent either on the data channel according to EDCA rules or as a group acknowledgment on the control channel.

Both the forwarding and receiving node maintain a NAV for each usable channel. A node monitors the control channel and keeps track of all reservations made by other nodes to determine the busy/idle status of data channels, and when they will become available. The Reservation Duration field on the CC-RTS/CC-CTS is used to update the NAV for the channel reserved. The CC-RTS/CC-CTS Reservation Duration field is different from the Duration/ID field in the MAC header of the CC-RTS/CC-CTS frames. The latter indicates the length of the CC-RTS/CC-CTS transmission on the control channel. A reservation request is declined if the receiving node deems the requested channel busy, or if all its radios are busy.

The receiving node responds with a CC-CTS within a time interval of length Short InterFrame Space (SIFS). A CC-CTS is sent to indicate acceptance of a channel reservation request. The Reservation Duration field is copied in the CC-CTS sent by the receiving node. If a CC-CTS is not received, the forwarding node assumes that the reservation request is declined. A reservation is accepted if the data channel indicated in the CC-RTS will become idle within a pre-specified time interval, according to the NAV maintained by the receiving node and if the receiving node has available radios to receive the transmission. Successful receipt of a data traffic transmission is followed by an acknowledgement sent either on the data channel according to EDCA rules or as a group acknowledgment on the control channel.

Different frames utilized include a CC-RTS frame, used by a node initiating a TXOP. This frame includes several fields including a source node; a destination node; a source node transmit channel; a duration and a number of frames in TXOP. A CC-CTS frame is used by a node accepting a TXOP. The CC-CTS frame includes several fields including a destination node; a source node; a source node transmit channel; a duration; a number of frames in TXOP; and a Radio Counter. A CC-ACK frame identifies the individual frame in a sequence of frames that were received successfully. The CC-ACK frame includes a destination node; source node; and a TXOP frame receipt status.

Channel Reservation occurs when the source node reserves its data channel for one or multiple frames by sending a CC-RTS frame to the destination node on the control channel, provided the Channel_State indication for the data channel is idle. The Reservation Duration field and number of TXOP frames are set in the CC-RTS. The destination node sends a CC-CTS in response within SIFS. The reservation request is accepted if the destination node has a Channel_State idle indication for the source node's data channel, and the destination node has available radios to receive the transmission; i.e. the Radio Counter is non-zero. If the reservation request is accepted by the Destination node, the Reservation Duration field is adjusted and the number of frames in the TXOP is repeated in the CC-CTS sent by the destination node and the CC-CTS includes the number of its radios that remain available to receive traffic—that is the Radio Counter. (The latter is not necessary, but it is useful to other nodes with frames to send to the destination node). If the reservation request is declined by the Destination node, the Reservation Duration field in the CC-CTS is set to 0 and the source node in that case sends another CC-RTS with a Reservation Duration field set to 0. Additionally, the destination node will send a CC-CTS with a 0 in the Reservation Duration field in response to a CC-RTS with a Reservation Duration field set to 0. When all frames in a TXOP are transmitted, the destination node will acknowledge the status of the transmit sequence by sending an acknowledgement, called CC-ACK, on the control channel. The frames received successfully will be identified in the CC-ACK. The acknowledgement will be transmitted by contending at the highest access priority Channel Reservation occurs when the source node reserve its data channel for one or multiple frames by sending a CC-RTS frame to the destination node on the control channel, provided the Channel_State indication for the data channel is idle. The Reservation Duration field and number of TXOP frames are set in the CC-RTS. The destination node sends a CC-CTS in response within SIFS. The reservation request is accepted if the destination node has a Channel_State idle indication for the source node's data channel, and the destination node has available radios to receive the transmission; i.e. the Radio Counter is non-zero. If the reservation request is accepted by the Destination node, the Reservation Duration field is adjusted and the number of frames in the TXOP is repeated in the CC-CTS sent by the destination node and the CC-CTS includes the number of its radios that remain available to receive traffic—that is the Radio Counter. (The latter is not necessary, but it is useful to other nodes with frames to send to the destination node). If the reservation request is declined by the Destination node, the Reservation Duration field in the CC-CTS is set to 0 and the source node in that case sends another CC-RTS with a Reservation Duration field set to 0. Additionally, the destination node will send a CC-CTS with a 0 in the Reservation Duration field in response to a CC-RTS with a Reservation Duration field set to 0.

When all frames in a TXOP are transmitted, the destination node will acknowledge the status of the transmit sequence by sending an acknowledgement, called CC-ACK, on the control channel. The frames received successfully will be identified in the CC-ACK. The acknowledgement will be transmitted by contention.

Aside from these additions and a special form of acknowledgement (which is discussed below), the CCC protocol observes the rules of the distributed random access protocol of IEEE 802.11 and its amendments (DCF and EDCA) for channel access and virtual carrier sensing, although further enhancements can enable better channel access prioritization.

CCC is backward compatible with existing 802.11 technologies. All nodes, that is both nodes using existing 802.11 technology and CCC compliant nodes, can communicate on the control channel through the existing 802.11 MAC protocol. In addition, a node that secures the reservation of a data channel will transmit on the reserved channel only after listening for a period equal to the arbitration inter-frame space to ensure that the channel is idle. This measure is introduced to allow for co-existence of CCC-compliant stations with legacy/independent stations.

Successful transmissions can be acknowledged, if desired. Nodes with a single radio (which transmit data on the control channel) can employ any of the acknowledgement forms provided by the 802.11 standard and its amendments. The same holds for nodes with two radios, one control radio and one data radio, except in certain situations when communicating with a node with multiple data radios.

Nodes may also transmit a group acknowledgement on the control channel, called the CC-Acknowledgement (CC-ACK), in order to notify the sender of the successful receipt of a TXOP. The CC-Ack would be used in order to avoid adjacent channel interference or in order to avoid exposed nodes.

An 'exposed node' is one that is either within the sensing range of the sender node but outside the interference range of the receiver node—therefore it could not receive a transmission from another node, but could transmit itself; or within the sensing range of the receiver node but outside the interference range of the sender node—therefore it could not transmit but it could receive another transmission directed to it. Mesh networks accentuate the exposed node problem because of the distances between nodes. Due to the spatial arrangement of a mesh, nodes become exposed and set their NAVs conservatively. New NAV rules allow what would have otherwise been 'exposed nodes' to transmit without causing collisions.

The exposed node problem can be avoided if reservations and acknowledgements are made on a control channel, which is different from the mesh traffic channel. The NAVs are modified accordingly. The exposed node problem causes the NAVs of neighbors of transmitting nodes to be set in an overly conservative way.

A node that can hear a NAV setting request (either a CC-RTS or a CC-CTS) refrains from transmitting, and when receiving a reservation request (i.e., a CC-RTS), it declines the reservation. Such a node may be able to either transmit or receive a transmission concurrently with the transmission that caused its NAV to be set. The node need not, however, refrain from transmitting concurrently if it is sufficiently distant from the destination of the ongoing transmission.

Ack prevents Tx(Rx) by exposed node on the same channel. An exposed node that hears a CC-RTS, but not the CC-CTS sent in response, cannot transmit concurrently because of a possible collision with the Ack. If an Ack were not returned on the same channel, transmission by the exposed node would be possible (e.g. suppressed Ack or Ack on separate channel).

Figure 1:
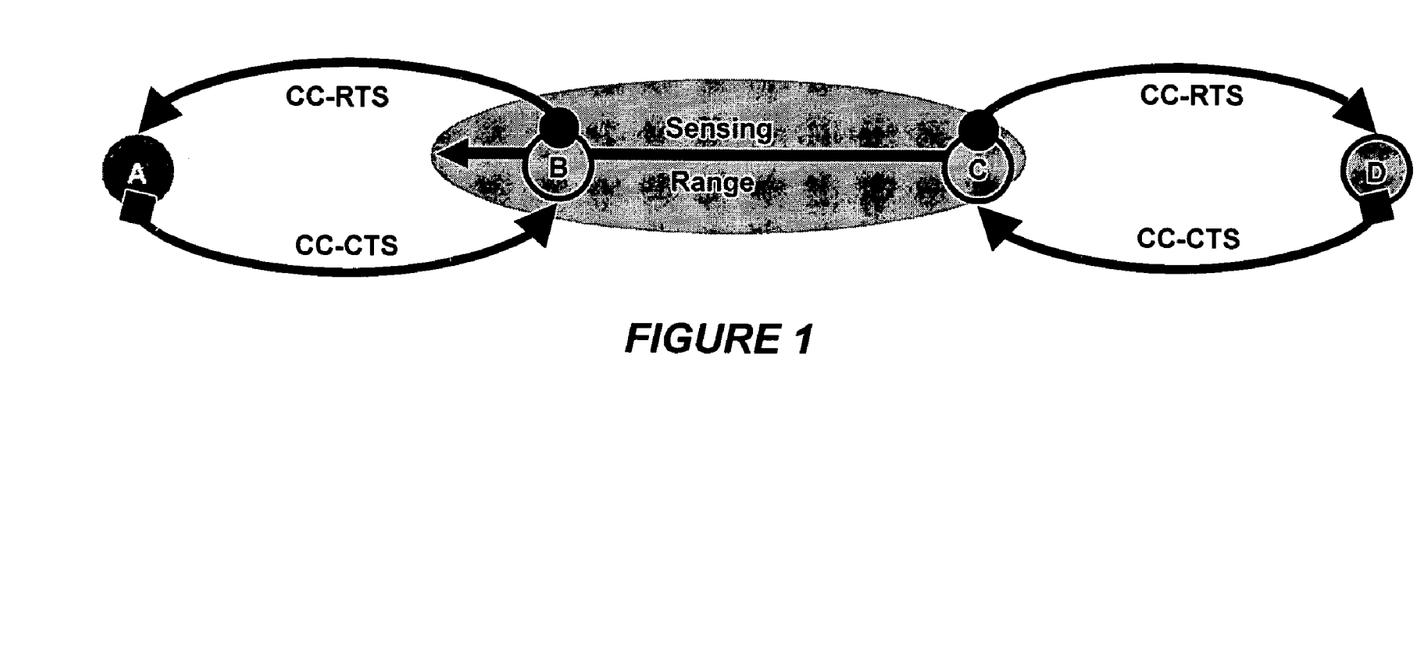
FIG. 1 depicts a diagram of a network showing a first example of an exposed node.

Referring now to FIG. 1, as example of an exposed node is shown. In this environment, node C is within a sensing range of node B. Node B is in communication with node A and node C is in communication with node D. When node C sends a CC-RTS to node D, all nodes within sensing range hear the CC-RTS (e.g. node B). Node B sets its NAV accordingly and refrains from transmitting. If a node is not within interference range of the destination of the CC-RTS, that node could transmit simultaneously without causing a collision. Node B can transmit at the same time as C sends a transmission to D. A node that hears a CC-RTS should not accept a CC-RTS directed to itself. Node B could not receive a transmission from Node A while C is transmitting to D.

A second transmission to a destination outside the sensing range of the CC-RTS would be possible from B. Since Node A is outside the sensing range of C, it did not hear the CC-RTS from C and would thus respond with a CC-CTS to a CC-RTS from node B. Node B becomes 'exposed' when node C transmits. Node C becomes 'exposed' when node B transmits.

Figure 2:
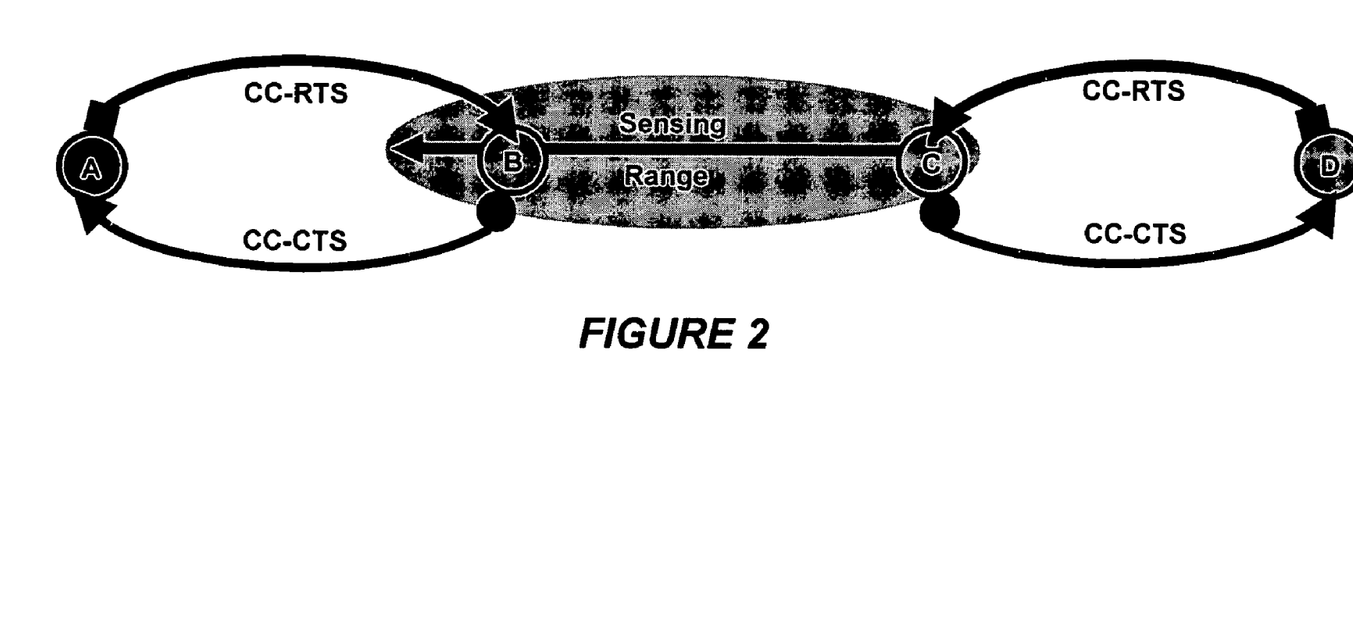
FIG. 2 depicts a diagram of a network showing a second example of an exposed node.

Another example of the exposed node problem is depicted in FIG. 2. In this environment, node C is within a sensing range of node B. Node B is in communication with node A and node C is in communication with node D. When Node D sends a CC-RTS to node C, all nodes within sensing range hear the CC-RTS. Node B sets its NAV accordingly and refrains from transmitting. If a node is not within interference range of the destination of the CC-RTS, it could transmit simultaneously without causing a collision. Node A can transmit at the same time as D sends a transmission to C. A second transmission to a destination outside the sensing range of the CC-RTS would be possible. Since Node A is outside the sensing range of C, it did not hear the CC-CTS from C and could thus send a CC-RTS to node B. A node that hears a CC-CTS should accept a CC-RTS directed to itself. Node B could receive a transmission from Node A while C is transmitting to D. Node B becomes 'exposed' when node D transmits. Node C becomes 'exposed' when node A transmits.

According to the CCC MAC protocol the control channel is used for reservations on traffic channels. The control channel is generally different from the channel carrying data traffic. A group acknowledgement, Mesh Ack (MACK), can be sent on the control channel, upon successful receipt of a TXOP. This is in place of regular Acks (individual or group) that are normally sent on the channel used by the transmission. By removing the Ack from the traffic channel, it is possible for an exposed node to transmit concurrently with a neighbor with a pending NAV-setting request. To determine when a node receiving a CC-RTS can transmit, new NAV rules are used. According to conventional 802.11 NAV rules, a CC-RTS/CC-CTS sets the NAV of a neighbor. Once the NAV is set, a node cannot send a CC-RTS or authorize a CC-RTS by sending a CC-CTS until the NAV expires. The existing NAV-setting rules are not adequate to enable an exposed node to transmit when appropriate.

The new rules for a NAV are as follows. A NAV must distinguish when a node receiving a CC-RTS/CC-CTS can transmit. A NAV must distinguish when a node receiving a CC-RTS/CC-CTS can accept a reservation (i.e., send a CC-CTS). To address the 'exposed node' problem, each node maintains two NAVs for each data channel, NAV_RTS and NAV_CTS. NAV_RTS is updated when receiving a CC-RTS with Reservation duration greater than zero and greater than a current value of the reservation duration. If NAV_RTS is greater then zero for a channel, a node must decline a CC-RTS reservation request for that channel by sending a CC-CTS with Reservation duration equal to zero. NAV_CTS is updated when receiving a CC-CTS with Reservation duration greater than zero and greater than a current value of the reservation duration. If NAV_CTS is greater than zero for a channel, a node must not attempt a reservation on that channel. If a node hears a CC-RTS with a Reservation duration equal to zero the NAV_RTS is not updated. If a node hears a CC-CTS with a Reservation duration equal to zero the NAV_CTS is not updated.

Co-pending patent application titled "Avoiding Hidden Terminals In A Wireless Local Area Networks" attorney docket number AVA06-30, filed on the same date as the present application and which is incorporated by reference in it's entirety, discusses hidden nodes and declining reservations and can be implemented in conjunction with the present invention. The NAV-setting process proposed in order to cancel a channel reservation caused by a declined CC-RTS can be incorporated in the new NAV-setting rules. In response to a CC-RTS, the NAV is set in two steps; a fixed time interval to allow for the reservation handshake, and the remaining reservation time.

If a node hears a CC-RTS with Reservation duration greater than zero, following an idle greater than SIFS, it updates the NAV_RTS for the time needed to receive a CC-CTS and a CC-RTS and extends the NAV if a cancellation is not received. If a node hears a CC-RTS with Reservation duration greater than zero, following an idle less than or equal to SIFS, it updates the NAV_RTS for the CC-RTS Reservation duration value. If a node hears a CC-CTS with Reservation duration greater than zero, it updates the NAV_CTS for the CC-CTS Reservation duration value (a simultaneous transmission by the node would cause collision).

The use of double NAVs for a channel enables an exposed node to either receive or transmit without interfering with the transmission for which the channel is reserved through the CC-RTS/CC-CTS. A transmission to or from an exposed node would interfere however with the acknowledgment, which is transmitted in the opposite direction. To avoid such collisions, the acknowledgement can be transmitted on the control channel. In other words, use of the CC-ACK, an acknowledgement transmitted on the control channel following transmission of a TXOP on a data channel, would be needed for acknowledgement to enable a WLAN mesh to prevent exposed nodes.

Figure 3A:
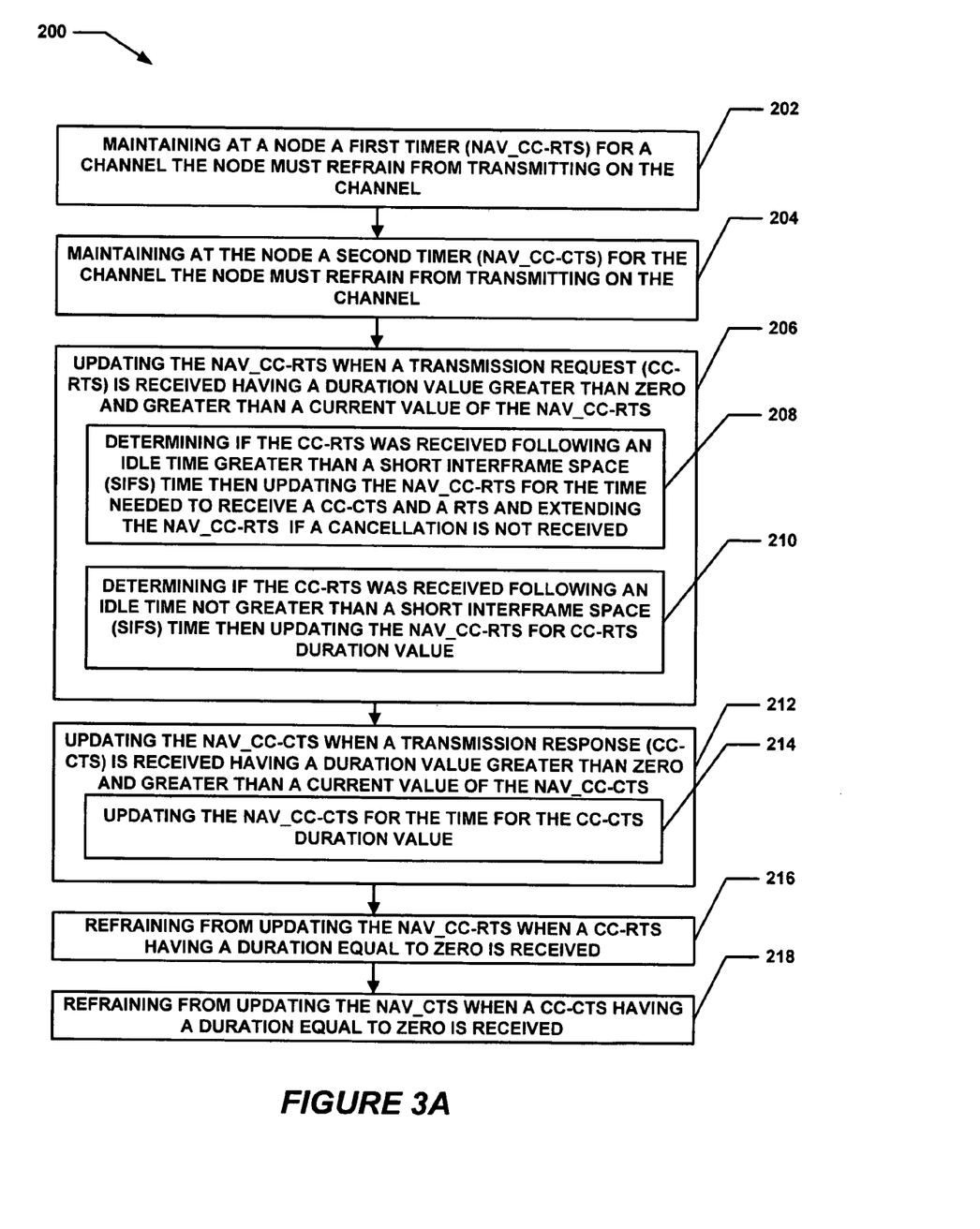
FIGS. 3A and 3B illustrates a particular embodiment of a method for avoiding exposed nodes in accordance with embodiments of the invention.
Figure 3B:
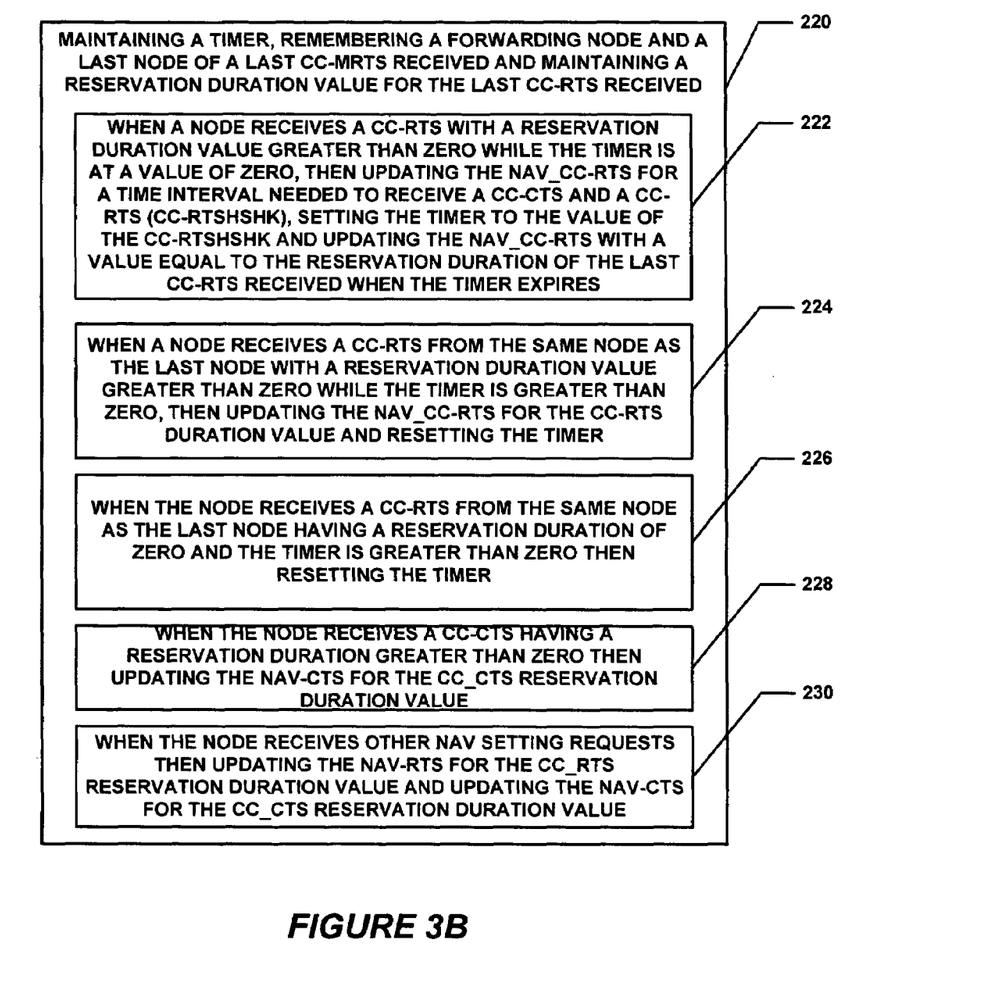

A flow chart of the presently disclosed method is depicted in FIGS. 1A and 1B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 3A and 3B, a particular embodiment of a method 100 for avoiding exposed nodes in a wireless network is shown. The method begins with processing block 102 which discloses maintaining at a node a first time period (NAV_RTS) for a channel other nodes must refrain from transmitting on the channel. Processing block 204 states maintaining at the node a second timer (NAV_CTS) for the channel other nodes must refrain from transmitting on the channel.

Processing block 206 recites updating the NAV_RTS when a transmission request (CC-RTS) frame is received having a reservation duration value greater than zero and greater than a current value of the NAV_RTS. As shown in processing block 208 the updating the NAV_RTS when a transmission request (CC-RTS) frame is received having a reservation duration value greater than zero and greater than a current value of the NAV_RTS comprises determining if the CC-RTS was received following an idle time greater than a Short InterFrame Space (SIFS) time then updating the NAV_RTS for the time needed to receive a CC-CTS and a CC-RTS and extending the NAV_RTS when a cancellation is not received. As further shown in processing block 210 updating the NAV_RTS when a transmission request (CC-RTS) is received having a reservation duration value greater than zero and greater than a current value of the NAV_RTS comprises determining if the CC-RTS was received following an idle time not greater than a Short InterFrame Space (SIFS) time then updating the NAV_RTS time period for the CC-RTS reservation duration value.

Processing block 212 discloses updating the NAV_CTS when a transmission response (CC-CTS) frame is received having a reservation duration value greater than zero and greater than a current value of the NAV_CTS. This may include, as shown in processing flock 214, updating the NAV_CTS when a transmission response (CC-CTS) is received having a reservation duration value greater than zero and greater than a current value of the NAV_CTS comprises updating the NAV_CTS time period for the CC-CTS reservation duration value.

Processing continues with processing block 216 which states refraining from updating the NAV_RTS when a CC-RTS frame having a reservation duration equal to zero is received. Processing block 218 recites refraining from updating the NAV_CTS when a CC-CTS frame having a reservation duration equal to zero is received.

Processing block 220 depicts that the method further includes maintaining a timer, remembering a forwarding node and a last node of a last CC-MRTS received and maintaining a reservation duration value for the last CC-RTS received. Processing block 222 states when a node receives a CC-RTS with a reservation duration value greater than zero while the timer is at a value of zero, then updating the NAV_RTS for a time interval needed to receive a CC-CTS and a CC-RTS (CC-RTSHSHK), setting the timer to the value of the CC-RTSHSHK and updating the NAV_RTS with a value equal to the reservation duration of the last CC-RTS received when the timer expires. Processing block 224 recites when a node receives a CC-RTS from the same node as the last node with a reservation duration value greater than zero while the timer is greater than zero, then updating the NAV_RTS for the CC-RTS duration value and resetting the timer. Processing block 226 discloses when the node receives a CC-RTS from the same node as the last node having a reservation duration of zero and the timer is greater than zero then resetting the timer. Processing block 228 states when the node receives a CC-CTS having a reservation duration greater than zero then updating the NAV-CTS for the CC_CTS reservation duration value; and processing block 230 recites when the node receives other NAV setting requests then updating the NAV-RTS and the NAV-CTS for the duration value in the NAV-setting frame.

Figure 4:
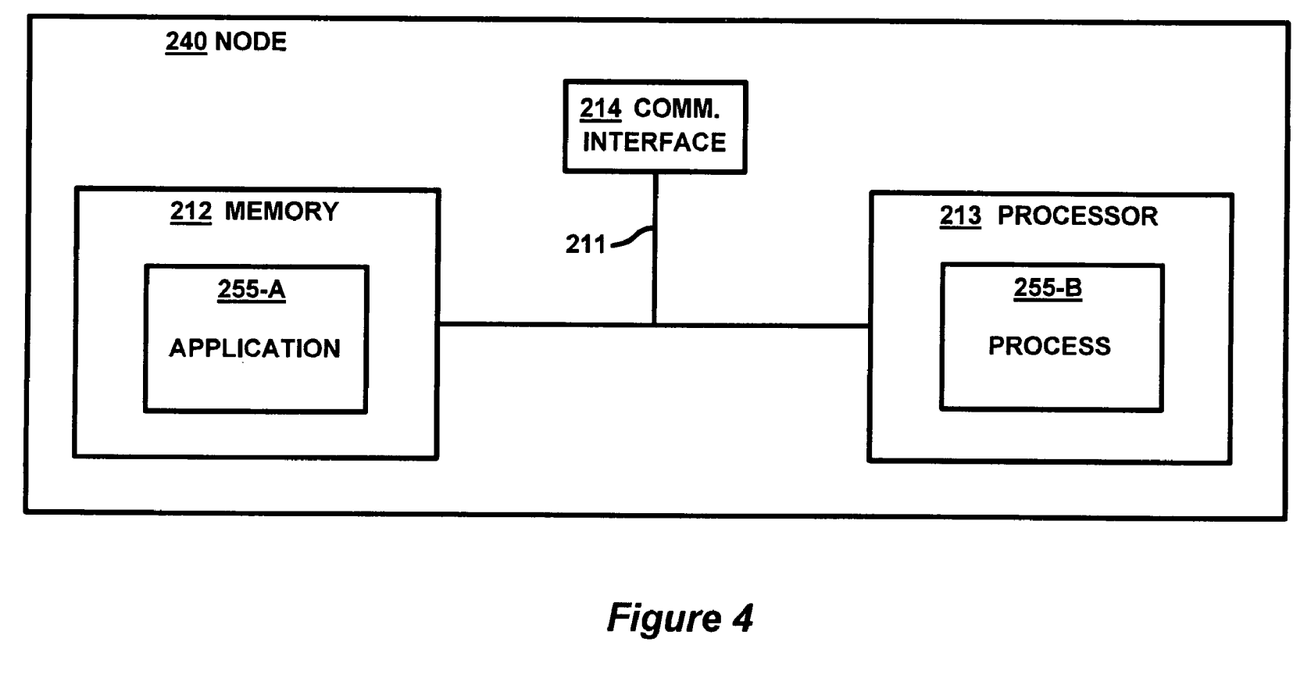
FIG. 4 is a block diagram of a node which operates in accordance with the present invention.

FIG. 4 illustrates example architectures of a computer system that is configured as anode 240. The node 240 may be any type of computerized system such as a personal computer, workstation, portable computing device, mainframe, server or the like. In this example, the node includes an interconnection mechanism 211 that couples a memory system 212, a processor 213, and a communications interface 214. The communications interface 214 allows the node 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What is claimed is:

1. A method comprising:

maintaining at a node a first timer, referred to as a Network Allocation Vector Request To Send (NaV_RTS), for a channel which, if set, prevents the node from authorizing a transmission on the channel to itself;

maintaining at the node a second timer, referred to as a Network Allocation Vector Clear To Send (NAV_CTS), for the channel which, if set, prevents the node from transmitting on the channel;

updating said NAV_RTS when a transmission request, referred to as a Control Channel Request To Send (CC-RTS), frame is received for that channel having a reservation duration value greater than zero and greater than a current value of said NAV_RTS; and updating said NAV_CTS when a transmission response, referred to as a Control Channel Clear To Send (CC-CTS), frame is received for that channel having a reservation duration value greater than zero and greater than a current value of said NAV_CTS, wherein said updating said NAV CTS when a transmission response (CC-CTS) is received for the channel having a reservation duration value greater than zero and greater than a current value of said NAV CTS comprises updating said NAV CTS time period for the CC-CTS reservation duration value.

2. The method of claim 1 further comprising refraining from updating said NAV_RTS when a CC-RTS frame having a reservation duration equal to zero is received.

3. The method of claim 1 further comprising refraining from updating said NAV_CTS when a CC-CTS frame having a reservation duration equal to zero is received.

4. The method of claim 1 wherein said updating said NAV_RTS when a transmission request (CC-RTS) frame is received for the channel having a reservation duration value greater than zero and greater than a current value of said NAV_RTS comprises determining if the CC-RTS was received following an idle time greater than a Short Inter-Frame Space (SIFS) time then updating said NAV_RTS for the time needed to receive a CC-CTS and a CC-RTS and extending the NAV_RTS when a cancellation is not received.

5. The method of claim 1 wherein said updating said NAV_RTS when a transmission request (CC-RTS) is received for the channel having a reservation duration value greater than zero and greater than a current value of said NAV_RTS comprises determining if the CC-RTS was received following an idle time not greater than a Short InterFrame Space (SIFS) time then updating said NAV_RTS time period for the CC-RTS reservation duration value.

6. A method comprising:
maintaining at a node a first timer, referred to as a Network Allocation Vector Request To Send (NAV RTS), for a channel which, if set, prevents the node from authorizing a transmission on the channel to itself;
maintaining at the node a second timer, referred to as a Network Allocation Vector Clear To Send (NAV CTS), for the channel which, if set, prevents the node from transmitting on the channel;
updating said NAV RTS when a transmission reguest, referred to as a Control Channel Request To Send (CC-RTS), frame is received for that channel having a reservation duration value greater than zero and greater than a current value of said NAV RTS;
updating said NAV CTS when a transmission response, referred to as a Control Channel Clear To Send (CC-CTS), frame is received for that channel having a reservation duration value greater than zero and greater than a current value of said NAV CTS; and
maintaining a timer for the channel, remembering a forwarding node and a last node of a last Control Channel Mesh Request To Send (CC-MRTS) received for the channel and maintaining a reservation duration value for the last CC-RTS received for the channel.

7. The method of claim 6 wherein when a node receives a CC-RTS for a channel with a reservation duration value greater than zero while said timer is at a value of zero, then updating the NAV_RTS for the channel for a time interval needed to receive a CC-CTS and a CC-RTS, referred to as a Control Channel Request To Send Handshake (CC-RTSHSHK), setting said timer to the value of said CC-RTSHSHK and updating the NAV_RTS for the channel with a value equal to the reservation duration of the last CC-RTS received for the channel when said timer expires.

8. The method of claim 6 wherein when a node receives a CC-RTS for a channel from the same node as the last node and the same channel with a reservation duration value greater than zero while said timer is greater than zero, then updating the NAV_RTS for the channel for the CC-RTS duration value and resetting said timer.

9. The method of claim 6 wherein when the node receives a CC-RTS for a channel from the same node and channel as the last node having a reservation duration of zero and said timer is greater than zero then resetting said timer.

10. The method of claim 6 wherein when the node receives a CC-CTS for a channel having a reservation duration greater than zero then updating the NAV-CTS for the channel for the CC_CTS reservation duration value.

11. The method of claim 6 wherein when the node receives other NAV setting requests for a channel then updating the NAV-RTS and the NAV-CTS for the channel for the duration value of the NAV-setting frame.

12. A computer readable medium having computer readable code thereon for avoiding exposed nodes, the medium comprising:
instructions for maintaining at a node a first timer, referred to as a Network Allocation Vector Request To Send (NAV_RTS,) for a channel which, if set, prevents the node from authoring a transmission on the channel to itself;
instructions for maintaining at the node a second timer, referred to as a Network Allocation Vector Clear To Send ($NAV_{13}$ CTS) for the channel which, if set, prevents the node from transmitting on the channel;
instructions for updating said NAV_RTS when a transmission request, referred to as a Control Channel Request To Send (CC-RTS) frame is received having a reservation duration value greater than zero and greater than a current value of said NAV_RTS; and
instructions for updating said NAV_CTS when a transmission response referred to as a Control Channel Clear To Send (CC-CTS) frame is received having a reservation duration value greater than zero and greater than a current value of said NAV_CTS; wherein said instructions for updating said NAV CTS for the channel when a transmission response (CC-CTS) is received for the channel having a reservation duration value greater than zero and greater than a current value of said NAV CTS comprises instructions for updating said NAV CTS time period for the CC-CTS reservation duration value.

13. The computer readable medium of claim 12 further comprising instructions for refraining from updating said NAV_RTS for a channel when a CC-RTS frame having a reservation duration equal to zero is received for the channel.

14. The computer readable medium of claim 12 further comprising instructions for refraining from updating said NAV_CTS for a channel when a CC-CTS frame having a reservation duration equal to zero is received for the channel.

15. The computer readable medium of claim 12 wherein said instructions for updating said NAV_RTS for the channel when a transmission request (CC-RTS) frame is received for the channel having a reservation duration value greater than zero and greater than a current value of said NAV_RTS for the channel comprises instructions for determining if the CC-RTS was received for the channel following an idle time greater than a Short InterFrame Space (SIFS) time then updating said NAV_RTS for the time needed to receive a CC-CTS and a CC-RTS and extending the NAV_RTS when a cancellation is not received.

16. The computer readable medium of claim 12 wherein said instructions for updating said NAV_RTS for the channel when a transmission request (CC-RTS) is received for the channel having a reservation duration value greater than zero and greater than a current value of said NAV_RTS comprises instructions for determining if the CC-RTS was received for the channel following an idle time not greater than a Short InterFrame Space (SIFS) time then updating said NAV_RTS time period for the CC-RTS reservation duration value.

17. A computer readable medium having computer readable code thereon for avoiding exposed nodes, the medium comprising:
- instructions for maintaining at a node a first timer, referred to as a Network Allocation Vector Request To Send (NAV RTS) for a channel which, if set, prevents the node from authoring a transmission on the channel to itself;
- instructions for maintaining at the node a second timer, referred to as a Network Allocation Vector Clear To Send (NAV CTS) for the channel which, if set, prevents the node from transmitting on the channel;
- instructions for updating said NAV RTS when a transmission request, referred to as a Control Channel Request To Send (CC-RTS) frame is received having a reservation duration value greater than zero and greater than a current value of said NAV RTS;
- instructions for updating said NAV CTS when a transmission response, referred to as a Control Channel Clear To Send (CC-CTS) frame is received having a reservation duration value greater than zero and greater than a current value of said NAV CTS; and
instructions for maintaining a timer, remembering a forwarding node and a last node of a last Control Channel Mesh Request To Send (CC-MRTS) received for the channel and maintaining a reservation duration value for the last CC-RTS received for the channel.

18. The computer readable medium of claim 17 further comprising instructions wherein when a node receives a CC-RTS for a channel with a reservation duration value greater than zero while said timer is at a value of zero, then updating the NAV_RTS for the channel for a time interval needed to receive a CC-CTS and a CC-RTS, referred to as a Control Channel Request To Send Handshake (CC-RTSHSHK), setting said timer to the value of said CC-RTSHSHK and updating the NAV_RTS for the channel with a value equal to the reservation duration of the last CC-RTS received for the channel when said timer expires.

19. The computer readable medium of claim 17 further comprising instructions wherein when a node receives a CC-RTS for a channel from the same node as the last node with a reservation duration value greater than zero while said timer is greater than zero, then updating the NAV_RTS for the channel for the CC-RTS duration value and resetting said timer.

20. The computer readable medium of claim 17 further comprising instructions wherein when the node receives a CC-RTS for a channel from the same node as the last node and for the same channel having a reservation duration of zero and said timer is greater than zero then resetting said timer.

21. The computer readable medium of claim 17 further comprising instructions wherein when the node receives a CC-CTS for a channel having a reservation duration greater than zero then updating the NAV-CTS for the channel for the CC_CTS reservation duration value.

22. The computer readable medium of claim 17 further comprising instructions wherein when the node receives other NAV-setting requests for a channel then updating the NAV-RTS and the NAV-CTS for the channel for the duration value in the NAV-setting frame.

\* \* \* \* \*